(12) United States Patent
Otsuki et al.

(10) Patent No.: US 7,269,473 B2
(45) Date of Patent: Sep. 11, 2007

(54) WORK INSTALLATION ERROR MEASURING APPARATUS

(75) Inventors: Toshiaki Otsuki, Hino (JP); Soichiro Ide, Fujiyoshida (JP); Takafumi Sasaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/397,692

(22) Filed: Apr. 5, 2006

(65) Prior Publication Data

US 2006/0247817 A1    Nov. 2, 2006

(30) Foreign Application Priority Data

Apr. 6, 2005  (JP)  ............................. 2005-110055

(51) Int. Cl.
*G06F 19/00* (2006.01)
*G05B 19/18* (2006.01)

(52) U.S. Cl. ........................................ 700/193; 700/61

(58) Field of Classification Search .................. 700/56, 700/57, 61, 62, 186, 192, 193
See application file for complete search history.

(56) References Cited

U.S. PATENT DOCUMENTS

| | | | | |
|---|---|---|---|---|
| 6,584,379 | B1 * | 6/2003 | Mukai et al. ................ | 700/254 |
| 6,640,607 | B2 * | 11/2003 | Abbe .......................... | 73/1.01 |
| 6,822,412 | B1 | 11/2004 | Gan et al. | |
| 7,083,368 | B2 * | 8/2006 | Nakazato et al. ........... | 409/201 |
| 2002/0148275 | A1 * | 10/2002 | Abbe .......................... | 73/1.01 |

FOREIGN PATENT DOCUMENTS

| | | |
|---|---|---|
| EP | 0 509 103 | 10/1992 |
| JP | 58-120109 | 7/1983 |
| JP | 02-064404 | 3/1990 |
| JP | 07-299697 | 11/1995 |

OTHER PUBLICATIONS

M. Terauchi et al., "Motion Estimation of a Block-Shaped Rigid Object for Robot Vision," Proceedings IROS '91, IEEE/RSJ International Workshop on Intelligent Robots and Systems, 1991, pp. 842-847.
European Search Report and Annex dated Jul. 21, 2006 of Application No. EP 06 25 1248.

* cited by examiner

*Primary Examiner*—M. N. Von Buhr
(74) *Attorney, Agent, or Firm*—Staas & Halsey LLP

(57) ABSTRACT

A work is installed on a table of a machine tool, and the coordinate system on the work is (X', Y', Z'). Each three points on respective three faces of the work, which are orthogonal to one another, A, B, C, D, E, F, G, H and I, are detected with a touch probe. From three points on the same plane, each of three formulas of planes which lies on the three points, respectively, are obtained. A position O' ($X_O$, $Y_O$, $Z_O$) of a point where the three plane intersect with one another is obtained. This position is a parallel translation error. From these three plane formulas, points on the X', Y' and Z' axes each being distant from the position O' by the length L are obtained. Rotation matrices are obtained from the respective points, position O' ($X_O$, $Y_O$, $Z_O$), and L. Rotary direction errors are obtained using the rotation matrices. In this manner, a work location error which is composed of the three-dimensional parallel translation error and three-dimensional rotary direction errors is obtained.

4 Claims, 9 Drawing Sheets

WORK INSTALLATION ERROR MEASURING APPARATUS

BACKGROUND OF THE INVENTION

1. Field of the Invention

The present invention relates to a measuring apparatus of a location error (parallel translation errors ΔX, ΔY, and ΔZ in X, Y, and Z axial directions, and rotary direction errors ΔA, ΔB, and ΔC around X-, Y-, and Z-axes) of a work installed on a table in a machine tool.

2. Description of the Related Art

In a machine tool, when a work is installed and fixed on a table, it may be installed apart from a position which should be installed, and a location error arises. That is, in a machine tool controlled by a numerical controller, displacement arises between a position of the work supposed in a machining program, and a position of the work installed on the table. This location error is composed of parallel translation errors ΔX, ΔY, and ΔZ in X, Y, and Z axial directions, which are mutually orthogonal straight line axes, and rotary direction errors ΔA, ΔB, and ΔC around the X-, Y-, and Z-axes.

A method and an apparatus for performing correction and working with a numerical controller without correcting a location of a work and modifying a machining program by setting this location error (parallel translation errors ΔX, ΔY, and ΔZ in X, Y, and Z axial directions, and rotary direction errors ΔA, ΔB, and ΔC around the X-, Y-, and Z-axes) in a numerical controller beforehand have been already provided (Japanese Patent Application Laid-Open No. 7-299697).

In addition, a method of finding a diameter of a touch probe and an amount of an installation position displacement of the touch probe when measuring size and end face positions of a work with the touch probe, and correcting measurement positions is known (refer to Japanese Patent Application Laid-Open No. 2-64404). In particular, regarding a work having two faces forming a square corner section, this Japanese Patent Application Laid-Open No. 2-64404 discloses a method of obtaining an intersection coordinate Pa (xa, ya) of a square corner section of a work, in addition to an inclination (θ) of the work, by measuring two points in one face of the square corner section and one point in the other face of the square corner section. When applying this method described in Japanese Patent Application Laid-Open No. 2-64404, it is possible to obtain a location error of a work with a two-dimensional shape. That is, let an intersection coordinate of a corner part of an original work be PO (xo, yo), and $\Delta x = xa - xo$ $\Delta Y = ya - yo$ $\Delta c = \theta$ then, it is possible to obtain errors ΔX and ΔY in the X-Y plane, and a rotation error ΔC around the Z-axis which is orthogonal to the X-Y plane, as a location error of the work with a two-dimensional shape.

Although measuring a position of a work with a sensor is described in the Japanese Patent Application Laid-Open No. 7-299697 mentioned above, a measuring method is not described at all.

In addition, the measuring method described in the Japanese Patent Application Laid-Open No. 2-64404 only obtains an error on two dimensions, but cannot obtain a parallel translation error ΔZ in a Z axial direction and the rotary direction errors ΔA and ΔB around the X-axis and Y-axis, in addition to parallel translation errors ΔX and ΔY in X-axis and Y-axis directions and a rotary direction error ΔC around the Z-axis.

A work usually has a three-dimensional shape, and as shown in FIG. 14, a location error of a three-dimensional work appears as parallel translation errors ΔX, ΔY, and ΔZ in X, Y, and Z axial directions, and rotary direction errors ΔA, ΔB, and ΔC around the X-, Y-, and Z-axes.

In FIG. 14, reference numeral 1 denotes a work installed in a position where the work should be installed originally, reference numeral 1' denotes an actually installed work, and let reference coordinates in which the work should be installed originally, be a coordinate system (X, Y, Z) (reference numeral O denotes an origin), and let a coordinate system, in which the work is actually installed and which has a location error, be a coordinate system (X', Y', Z') (reference numeral O' denotes an origin). In this case, a vector [OO'] is a parallel translation error (ΔX, ΔY, ΔZ), and, the (X, Y, Z) coordinate system transfers to a coordinate system (X', Y', Z') with rotation error ΔA around the X-axis, a rotation error ΔB around the Y-axis, and a rotation error ΔC around the Z-axis added, and those ΔA, ΔB, and ΔC constitute rotary direction errors (ΔA, ΔB, ΔC) around respective axes.

SUMMARY OF THE INVENTION

The present invention relates to a work installation error measuring apparatus which measures an installation error of a work which is installed on a table of a machine tool and which has at least three faces orthogonal to one another.

A first aspect of the present invention comprises means of measuring positions of at least six points in the three faces orthogonal to one another, and means of obtaining, from the positions of the above-mentioned at least six points measured, parallel translation errors ΔX, ΔY, and ΔZ in the X, Y, and Z axial directions, and rotary direction errors ΔA, ΔB, and ΔC around the respective X-, Y-, and Z-axes at the time of installation of the work.

A second aspect of the present invention comprises means of measuring positions of three points in each of the three faces orthogonal one another, that is, positions of nine points in total, and means of obtaining, from the positions of the above-mentioned nine points measured, parallel translation errors ΔX, ΔY, and ΔZ in the X, Y, and Z axial directions, and rotary direction errors ΔA, ΔB, and ΔC around the respective X-, Y-, and Z-axes at the time of installation of the work.

A third aspect of the present invention comprises means of measuring positions of two points in each of the three faces orthogonal to one another, that is, positions of six points in total, and means of obtaining, from the positions of the above-mentioned six points measured, parallel translation errors ΔX, ΔY, and ΔZ in the X, Y, and Z axial directions, and rotary direction errors ΔA, ΔB, and ΔC around the respective X-, Y-, and Z-axes at the time of installation of the work.

A fourth aspect of the present invention comprises means of measuring three points in a first face, two points in a second face, and one point in a third face, of the above-mentioned three faces of the work which are orthogonal to one another, and means of obtaining, from the positions of the measured six points in total, parallel translation errors ΔX, ΔY, and ΔZ in the X, Y, and Z axial directions, and rotary direction errors ΔA, ΔB, and ΔC around the respective X-, Y-, and Z-axes at the time of installation of the work.

Since the present invention has the above configuration, in a machining shape which has three faces which are orthogonal to one another, it is possible to measure positions of at least six points in the mutually orthogonal three faces, and to obtain, from the positions of the at least six points measured, parallel translation errors ΔX, ΔY, and ΔZ in the X, Y, and Z axial directions, and rotary direction errors ΔA, ΔB, and ΔC around the respective X-, Y-, and Z-axes at the time of installation of a work.

DETAILED DESCRIPTION OF THE PREFERRED EMBODIMENTS

Several embodiments of the present invention will be explained below with drawings.

First Embodiment

First, a principle of installation error measurement in a first embodiment of a work installation error measuring apparatus of the present invention will be explained. In this first embodiment, by performing position measurement of three points, respectively, in each of three faces which are orthogonal to one another, that is, by performing measurement of nine points in total, a location error (parallel translation errors ΔX, ΔY, and ΔZ in the X, Y, and Z axial directions, and rotary direction errors ΔA, ΔB, and ΔC around the X-, Y-, and Z-axes) is obtained.

Figure 1:
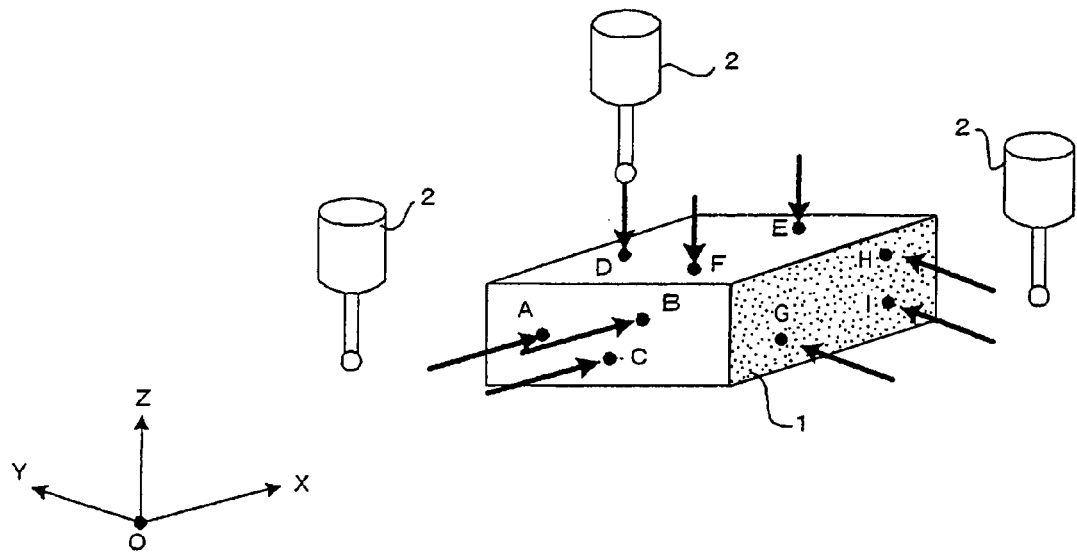
FIG. 1 is an explanatory diagram of position measurement of each face in a work in a first embodiment of the present invention.

FIG. 1 is an explanatory diagram of position measurement of each face in a work in this first embodiment. Points A to I, three points for each face, are measured by operating a touch probe 2 on mutually orthogonal faces of a work 1', installed on a table of a machine tool, as shown in FIG. 1.

In order to measure these points accurately, it is necessary to offset by probe radius (radius of probe ball) and a probe installation error, but those are not taken into consideration here. Thus, the probe radius and the probe installation error are regarded as 0. Correction for the probe radius and the probe installation error will be mentioned later.

Figure 2:
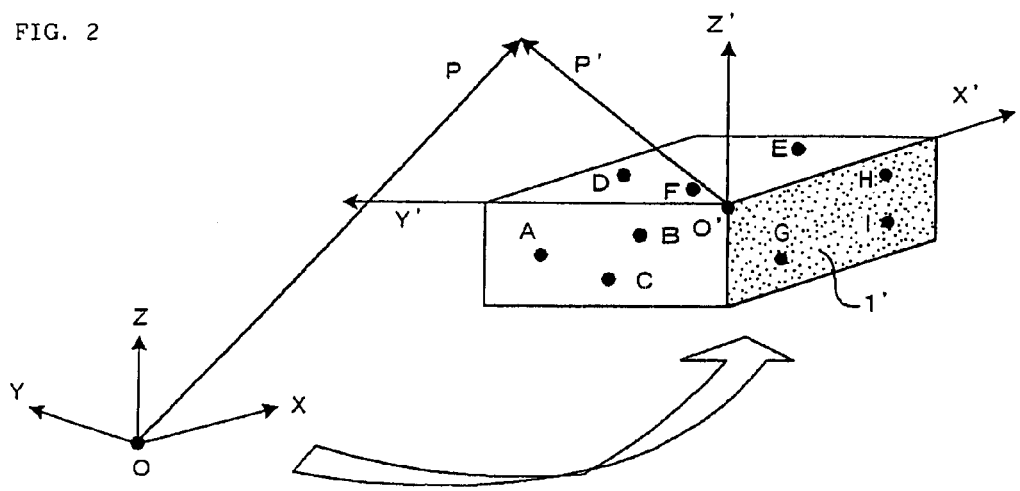
FIG. 2 is a diagram for explaining transformation from a coordinate system (X, Y, Z) which is an original coordinate system in the first embodiment to a coordinate system (X', Y', Z') which is a coordinate system having a location error at the time of installing a work.
Figure 14:
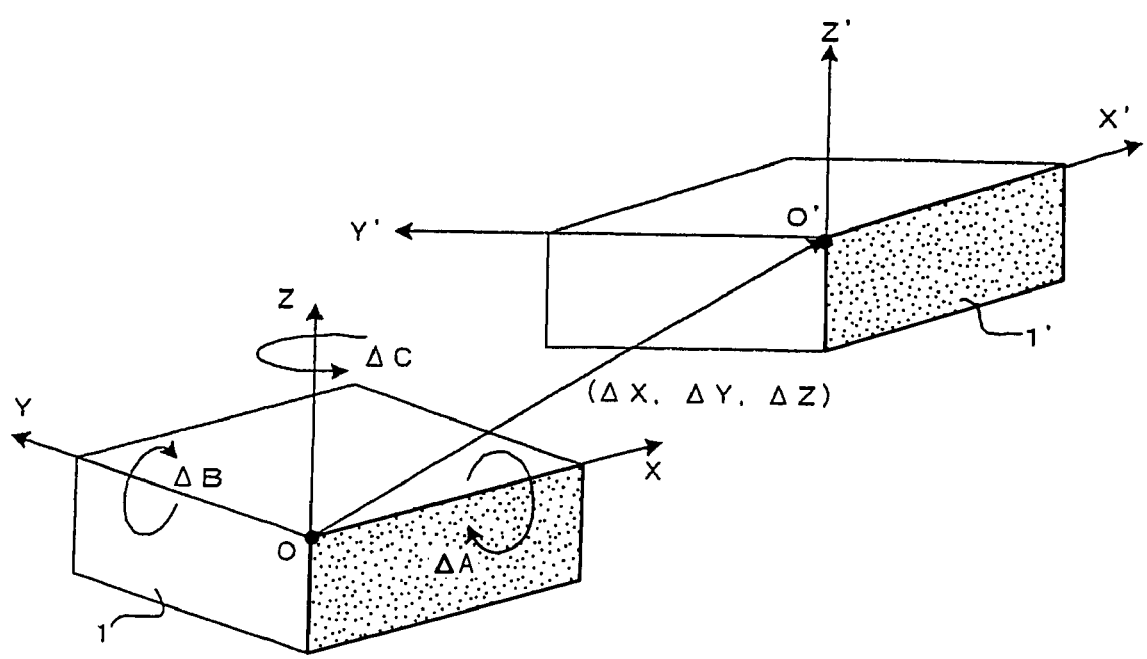
FIG. 14 is a diagram for explaining transformation from a coordinate system (X, Y, Z) which is an original coordinate system to a coordinate system (X', Y', Z') which is a coordinate system having a location error at the time of installing a work.

As shown in FIGS. 14 and 2, let an original reference coordinate system be a coordinate system (X, Y, Z), and let a coordinate system having a location error at the time of installing a work be a coordinate system (X', Y', Z'). Here, three sides of a work, formed by the three faces of the work which are orthogonal to, and intersect with, one another, are on respective coordinate axes of the (X, Y, Z) coordinate system and the (X', Y', Z') coordinate system. In addition, a work in a position where it is to be originally installed is not shown in FIG. 2.

Transformation from a position in the (X, Y, Z) coordinate system to a position in the coordinate system (X', Y', Z') is expressed by the following formula (1). In short, a command position P' $(X_P', Y_P', Z_P')^T$ in the (X', Y', Z') coordinate system is transformed into an actual position P $(X_P, Y_P, Z_P)^T$ in the (X, Y, Z) coordinate system by the formula (1).

$$(X_P, Y_P, Z_P)^T = M*(X_P', Y_P', Z_P')^T + (\Delta X, \Delta Y, \Delta Z)^T \quad (1)$$

where a transformation matrix M is a transformation matrix by the rotary direction errors ΔA, ΔB, and ΔC, and (ΔX, ΔY, ΔZ) is a parallel translation error.

Each component of the transformation matrix M is expressed by the following formula (2).

$$M = \begin{bmatrix} m11 & m12 & m13 \\ m21 & m22 & m23 \\ m31 & m32 & m33 \end{bmatrix} \quad (2)$$

where "$T$" expresses transposition. The parallel translation error (ΔX, ΔY, ΔZ) is also a position of the point O' $(X_{O'}, Y_{O'}, Z_{O'})$. Hereafter, when not specified, a coordinates position is a position in the (X, Y, Z) coordinate system.

The transfer matrix M is generated by the following formula (3) using rotation matrices R(z;ΔC), R(y;ΔB), and R(x;ΔA).

$$M = R(z;\Delta C)*R(y;\Delta B)*R(x;\Delta A) \quad (3)$$

where the rotation matrix R(x:ΔA) is a rotation matrix of rotating the coordinate system (X, Y, Z) by ΔA° around the X-axis, the rotation matrix R(y:ΔB) is a rotation matrix of rotating the coordinate system (X, Y, Z) by ΔB° around the Y-axis, the rotation matrix R(z:ΔB) is a rotation matrix of rotating the coordinate system (X, Y, Z) by ΔC° around the Z-axis, and they are expressed by the following formulas (4), (5), and (6).

$$R(x; \Delta A) = \begin{bmatrix} 1 & 0 & 0 \\ 0 & \cos\Delta A & -\sin\Delta A \\ 0 & \sin\Delta A & \cos\Delta A \end{bmatrix} \quad (4)$$

$$R(y; \Delta B) = \begin{bmatrix} \cos\Delta B & 0 & \sin\Delta B \\ 0 & 1 & 0 \\ -\sin\Delta B & 0 & \cos\Delta B \end{bmatrix} \quad (5)$$

$$R(z; \Delta C) = \begin{bmatrix} \cos\Delta C & -\sin\Delta C & 0 \\ \sin\Delta C & \cos\Delta C & 0 \\ 0 & 0 & 1 \end{bmatrix} \quad (6)$$

In addition, in the above-mentioned formulas (4) to (6), for convenience, parentheses are omitted in trigonometric functions as $\cos(\Delta A)$ is expressed as $\cos \Delta A$, and $\sin(\Delta A)$ is expressed as $\sin \Delta A$.

FIGS. 3A to 3D are explanatory diagrams of coordinate transformation by the formula (1) mentioned above.

Figure 3A:
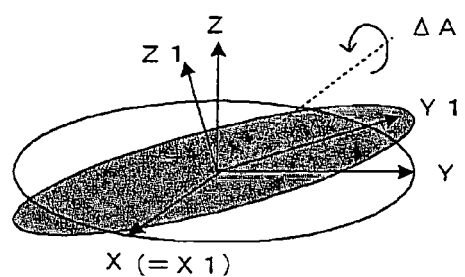
FIGS. 3A to 3D are explanatory diagrams of rotation matrices and parallel translation.
Figure 3B:
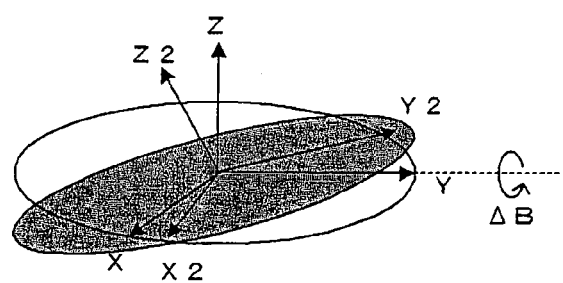
Figure 3C:
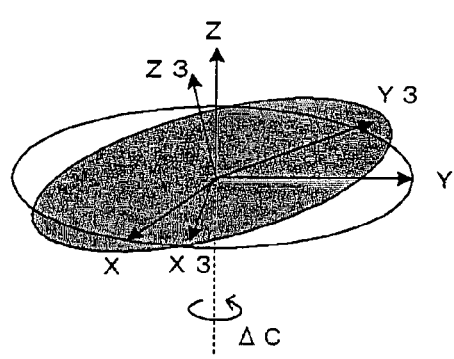
Figure 3D:
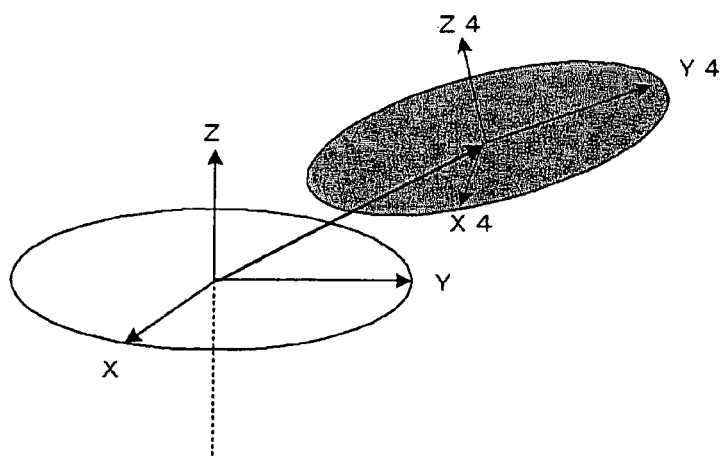

FIG. 3A shows a coordinate system (X1, Y1, Z1) obtained by rotating the coordinate system (X, Y, Z) by $\Delta A°$ around the X-axis by the rotation matrix $R(x;\Delta A)$, FIG. 3B shows a coordinate system (X2, Y2, Z2) obtained by rotating the coordinate system (X, Y, Z) by $\Delta B°$ around the Y-axis by the rotation matrix $R(y;\Delta B)$, FIG. 3C shows a coordinate system (X3, Y3, Z3) obtained by rotating the coordinate system (X, Y, Z) by $\Delta C°$ around the Z-axis by the rotation matrix $R(z;\Delta C)$, and FIG. 3D shows a coordinate system (X4, Y4, Z4) at the time of performing parallel translation by ($\Delta X$, $\Delta Y$, $\Delta Z$), and coordinate system (X4, Y4, Z4)=coordinate system (x', Y', Z') holds.

A plane which lies on three points (A, B, C) is expressed by the following formula (7) using a determinant.

$$\begin{vmatrix} X & Y & Z & 1 \\ X_A & Y_A & Z_A & 1 \\ X_B & Y_B & Z_B & 1 \\ X_C & Y_C & Z_C & 1 \end{vmatrix} = 0 \quad (7)$$

where $(X_A, Y_A, Z_A)$ is a coordinate value of a point A, $(X_B, Y_B, Z_B)$ is a coordinate value of a point B, and $(X_C, Y_C, Z_C)$ is a coordinate value of a point C. In addition, the coordinate values of the points A, B, and C are positions in the (X, Y, Z) coordinate system. The following points D, E, F, G, H, and I are also positions in the (X, Y, Z) coordinate system similarly.

This formula (7) is expanded and the following formula (8) is derived.

$$L_{ABC}X + m_{ABC}Y + n_{ABC}Z - p_{ABC} = 0 \quad (8)$$

where $L_{ABC}$, $m_{ABC}$, $n_{ABC}$, and $-P_{ABC}$ are coefficients and constants of X, Y, and Z respectively when expanding formula (7).

Similarly, a plane lies on three points (D, E, F) is expressed by the following formula (9) using a determinant.

$$\begin{vmatrix} X & Y & Z & 1 \\ X_D & Y_D & Z_D & 1 \\ X_E & Y_E & Z_E & 1 \\ X_F & Y_F & Z_F & 1 \end{vmatrix} = 0 \quad (9)$$

where $(X_D, Y_D, Z_D)$ is a coordinate value of a point D, $(X_E, Y_E, Z_E)$ is a coordinate value of a point E, and $(X_F, Y_F, Z_F)$ is a coordinate values of a point F.

This formula (9) is expanded and the following formula (10) is derived.

$$L_{DEF}X + m_{DEF}Y + n_{DEF}Z - p_{DEF} = 0 \quad (10)$$

where $L_{DEF}$, $m_{DEF}$, $n_{DEF}$, and $-P_{DEF}$ are coefficients and constants of X, Y, and Z respectively when expanding formula (9).

Similarly, a plane which lies on three points (G, H, I) is expressed in the following formula (11) using a determinant.

$$\begin{vmatrix} X & Y & Z & 1 \\ X_G & Y_G & Z_G & 1 \\ X_H & Y_H & Z_H & 1 \\ X_I & Y_I & Z_I & 1 \end{vmatrix} = 0 \quad (11)$$

where, $(X_G, Y_G, Z_G)$ is a coordinate value of a point G, $(X_H, Y_H, Z_H)$ is a coordinate value of a point H, and $(X_I, Y_I, Z_I)$ is a coordinate value of a point I.

This formula (11) is expanded and the following formula (12) is derived.

$$L_{GHI}X + m_{GHI}Y + n_{GHI}Z - p_{GHI} = 0 \quad (12)$$

where $L_{GHI}$, $M_{GHI}$, $N_{GHI}$, and $-P_{GHI}$ are coefficients and constants of X, Y, and Z respectively when expanding formula (11).

Since a point where the plane which lies on three points (A, B, C), the plane which lies on three points (D, E, F), and the plane which lies on three points (G, H, I) intersect with one another is O', it is possible to obtain the position O' $(X_O, Y_O, Z_O)$ by solving simultaneous equations of three formulas, formulas (8), (10) and (12), about X, Y and Z, and obtaining solutions, $X_O$, $Y_O$ and $Z_O$.

Certain suitable length L is introduced.

Formula $Y = Y_O + L$ is substituted into formula (8).

$$L_{ABC}X + m_{ABC}(Y_O + L) + n_{ABC}Z - P_{ABC} = 0 \quad (13)$$

Formula $Y = Y_O + L$ is substituted into formula (10).

$$L_{DEF}X + m_{DEF}(Y_O + L) + n_{DEF}Z - p_{DEF} = 0 \quad (14)$$

Figure 4:
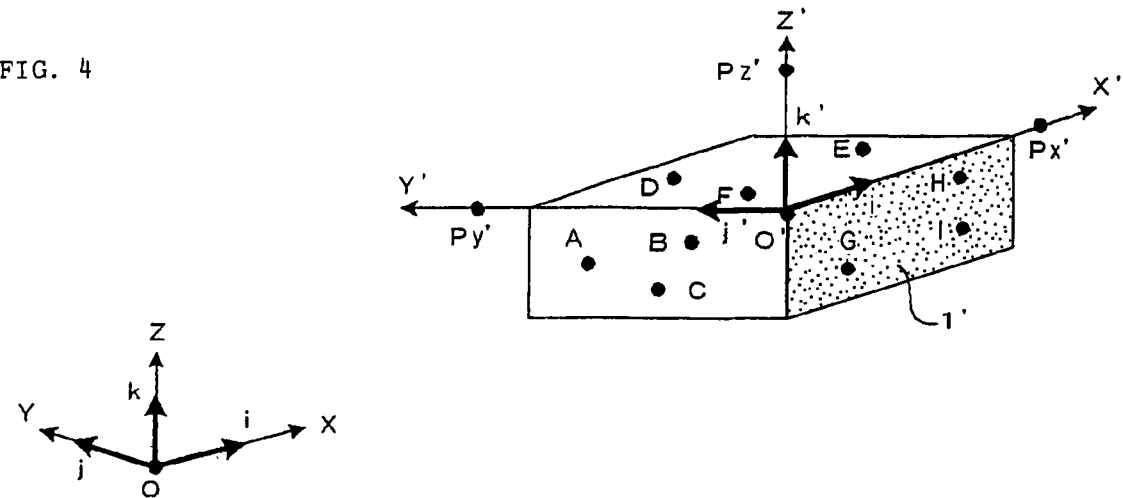
FIG. 4 is a diagram for explaining a process of obtaining a location error such as a normalized vector.

Then, solving simultaneous equations of two formulas, formulas (13) and (14), about X and Z, and obtaining solutions, $X_{PY}$ and $Z_{PY}$, it is possible to obtain a position $P_{Y'}$ $(X_{PY}, Y_O + L, Z_{PY})$ This position $P_{Y'}$ is a point on a straight line O'Y' (Y'-axis on the coordinate system (X', Y', Z')) (refer to FIG. 4).

In addition, here, it is supposed that an angle formed by the straight line OY (Y-axis on the coordinate system (X, Y, Z)) and the straight line O'Y' is not so large (less than 45° or so).

Formula $X = X_O + L$ is substituted into formula (10).

$$L_{DEF}(X_O + L) + m_{DEF}Y + n_{DEF}Z - p_{DEF} = 0 \quad (15)$$

Formula $X=X_O+L$ is substituted into formula (12).

$$L_{GHI}(X_O+L)+m_{GHI}Y+n_{GHI}Z-p_{GHI}=0 \quad (16)$$

Then, solving simultaneous equations of two formulas, formulas (15) and (16), about Y and Z, and obtaining solutions, $Y_{PX}$ and $Z_{PX}$, it is possible to obtain a position $P_X'$ ($X_O+L$, $Y_{PK}$, $Z_{PX}$). This position $P_X'$ is a point on a straight line O'X' (X'-axis on the coordinate system (X', Y', Z')) (refer to FIG. 4).

In addition, here, it is supposed that an angle formed by the straight line OX (X-axis on the coordinate system (X, Y, Z)) and the straight line O'X' is not so large (less than 45° or so).

Formula $Z=Z_O+L$ is substituted into formula (12)

$$L_{GHI}X+m_{GHI}Y+n_{GHI}(Z_O+L)-P_{GHI}=0 \quad (17)$$

Formula $Z=Z_O+L$ is substituted into formula (8).

$$L_{ABC}X+m_{ABC}Y+n_{ABC}(Z_O+L)-p_{ABC}=0 \quad (18)$$

Then, solving simultaneous equations of two formulas, formulas (17) and (18), about Y and Z, and obtaining solutions, $X_{PZ}$ and $Y_{PZ}$, it is possible to obtain $P_Z'$ ($X_{PZ}$, $Y_{PZ}$, $Z_O+L$)

This $P_Z'$ is a point on a straight line O'Z' (Z'-axis in the coordinate system (X', Y', Z')) (refer to FIG. 4).

In addition, here, it is supposed that an angle formed by the straight line OZ (Z-axis on the coordinate system (X, Y, Z)) and the straight line O'Z' is not so large (less than 45° or so).

Let normalized-vectors with length of 1 in OX, OY, and OZ directions be i, j, and k, respectively. These i, j, and k are expressed as follows.

$$i=(1,0,0)^T$$

$$j=(0,1,0)^T$$

$$k=(0,0,1)^T$$

In addition, let normalized vectors of a vector (O'$P_X'$), a vector (O'$P_Y'$), and a vector (O'$P_Z'$) whose length are 1 be i', j', and k', respectively.

Thus, these are calculated as the following formulas (19) to (21).

$$i' = \frac{(L, Y_{PX}-Y_O, Z_{PX}-Z_O)^T}{\sqrt{L^2+(Y_{PX}-Y_O)^2+(Z_{PX}-Z_O)^2}} \quad (19)$$

$$j' = \frac{(X_{PY}-X_O, L, Z_{PY}-Z_O)^T}{\sqrt{(X_{PY}-X_O)^2+L^2+(Z_{PY}-Z_O)^2}} \quad (20)$$

$$k' = \frac{(X_{PZ}-Z_O, Y_{PZ}-Y_O, L)^T}{\sqrt{(X_{PZ}-X_O)^2+(Y_{PZ}-Y_O)^2+L^2}} \quad (21)$$

At that time, the following formulas hold.

$$i'=M*i \quad (22)$$

$$j'=M*j \quad (23)$$

$$k'=M*k \quad (24)$$

The following formulas are derived from these formulas.

$$i'=(m11,m21,m31)^T \quad (25)$$

$$j'=(m12,m22,m32)^T \quad (26)$$

$$k'=(m13,m23,m33)^T \quad (27)$$

It is possible to obtain nine components (m11 to m33) of the transfer matrix M as the following formulas (28) to (36).

$$m11 = \frac{1}{\sqrt{L^2+(Y_{PX}-Y_O)^2+(Z_{PX}-Z_O)^2}}*L \quad (28)$$

$$m21 = \frac{1}{\sqrt{L^2+(Y_{PX}-Y_O)^2+(Z_{PX}-Z_O)^2}}*(Y_{PX}-Y_O) \quad (29)$$

$$m31 = \frac{1}{\sqrt{L^2+(Y_{PX}-Y_O)^2+(Z_{PX}-Z_O)^2}}*(Z_{PX}-Z_O) \quad (30)$$

$$m12 = \frac{1}{\sqrt{(X_{PY}-X_O)^2+L^2+(Z_{PY}-Z_O)^2}}*(X_{PY}-X_O) \quad (31)$$

$$m22 = \frac{1}{\sqrt{(X_{PY}-X_O)^2+L^2+(Z_{PY}-Z_O)^2}}*L \quad (32)$$

$$m32 = \frac{1}{\sqrt{(X_{PY}-X_O)^2+L^2+(Z_{PY}-Z_O)^2}}*(Z_{PY}-Z_O) \quad (33)$$

$$m13 = \frac{1}{\sqrt{(X_{PZ}-X_O)^2+(Y_{PZ}-Y_O)^2+L^2}}*(X_{PZ}-X_O) \quad (34)$$

$$m23 = \frac{1}{\sqrt{(X_{PZ}-X_O)^2+(Y_{PZ}-Y_O)^2+L^2}}*(Y_{PZ}-Y_O) \quad (35)$$

$$m33 = \frac{1}{\sqrt{(X_{PZ}-X_O)^2+(Y_{PZ}-Y_O)^2+L^2}}*L \quad (36)$$

If the transfer matrix M is determined, values in formula (3), except unknowns $\Delta A$, $\Delta B$, and $\Delta C$, become known. Since the transfer matrix M has nine components, formula (3) becomes nine simultaneous equations. Hence, these are enough to obtain the unknowns $\Delta A$, $\Delta B$ and $\Delta C$, and hence, it is possible to obtain $\Delta A$, $\Delta B$ and $\Delta C$ by solving the simultaneous equations.

Now, before the description of FIG. 1, it was noted that correction of the probe radius (radius of a probe ball) of the touch probe 2 and the probe installation error would be mentioned later. Now, correction of the probe radius and the probe installation error are explained below.

Although taking into account offsets of the probe radius and the probe installation error, the plane which lies on three points (A, B, C), the plane which lies on three points (D, E, F), and the plane which lies on three points (G, H, I) just move in parallel by the offsets in the (X', Y', Z') coordinate system, and hence, correction of the rotary direction errors $\Delta A$, $\Delta B$, and $\Delta C$ is unnecessary. Hence, the correction of the probe radius and the probe installation error is required only with respect to the parallel translation errors, $\Delta X$, $\Delta Y$ and $\Delta Z$.

Figure 5:
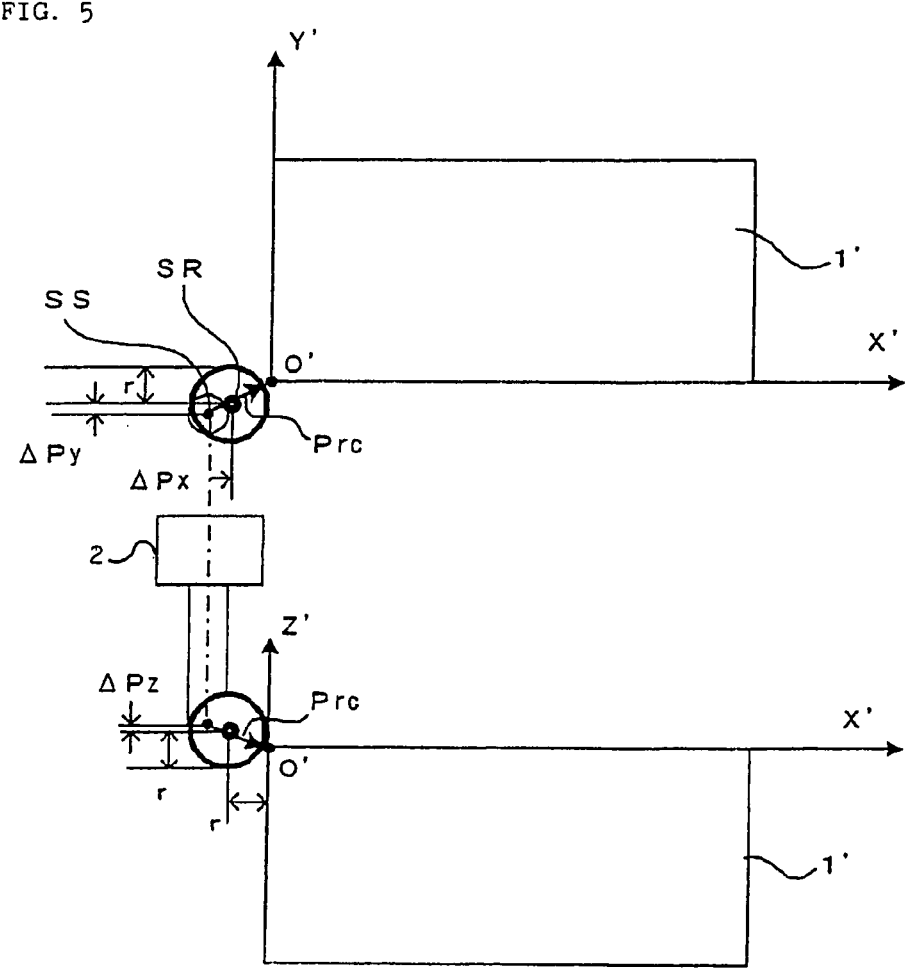
FIG. 5 is an explanatory diagram of a probe correction vector.

FIG. 5 is an explanatory diagram of a probe installation error, which shows the state where the tip of the touch probe 2 is moved from a position which is enough minus on the X'-axis, enough minus on the Y'-axes, and enough plus on the Z'-axis, in a direction orthogonal to a plane formed by the origin O', the X'-axis and the Y'-axis in the (X', Y', Z') coordinate system until it touches the work 1', in a direction orthogonal to a plane formed by the origin O', the Y'-axis and the Z'-axis until it touches the work 1', and in a direction orthogonal to a plane formed by the origin O', the Z'-axis and the X'-axis until it touches the work 1'. In FIG. 5, reference symbol SR denotes a center point of the probe ball, and reference symbol SS denotes a position to be recognized as a detected position. Let the probe radius (radius of the probe ball) be r, and let the probe installation error be ($\Delta P_X$, $\Delta P_Y$, $\Delta P_Z$), then a probe correction vector (correction vector obtained by adding the probe radius and the probe installation error) $P_{rc}$ in the (X', Y', Z') coordinate system is given by the following formula (37).

$$P_{rc}=(r+\Delta P_X, r+\Delta P_Y, -r+\Delta P_Z)^T \quad (37)$$

Probe radius correction $P_{rc}'$ converted in the (X, Y, Z) coordinate system is obtained by the following formula (38).

$$P_{rc}'=M*P_{rc} \quad (38)$$

Hence, parallel translation errors $\Delta X'$, $\Delta Y'$, and $\Delta Z'$ in consideration of the probe radius correction is given by the following formula (39).

$$(\Delta X',\Delta Y',\Delta Z')^T=(\Delta X,\Delta Y,\Delta Z)^T+P_{rc}' \quad (39)$$

Replacing $\Delta X$, $\Delta Y$ and $\Delta Z$ with $\Delta X'$, $\Delta Y'$ and $\Delta Z'$ in formula (1), a parallel translation error in consideration of probe radius correction is given. Hereafter, the parallel translation errors $\Delta X$, $\Delta Y$ and $\Delta Z$ are taken as parallel translation errors in consideration of this probe radius correction.

Second Embodiment

A second embodiment in which two points are measured respectively in each of three faces which are orthogonal to one another, that is, six points in total are measure, will be explained below.

Figure 6:
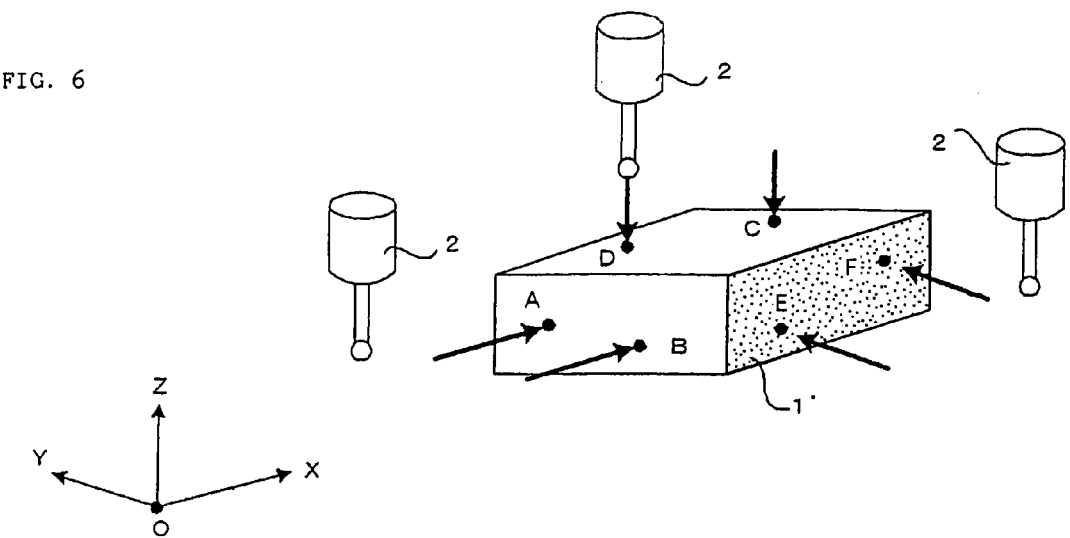
FIG. 6 is an explanatory diagram of position measurement of each face in a work in a second embodiment of the present invention.

It is assumed that the touch probe 2 is operated on each face as shown in FIG. 6, and the points A to F, two points for each face, are measured.

Let position vectors of the points A, B, C, D, E, and F in the (X, Y, Z) coordinate system be ($X_A$, $Y_A$, $Z_A$), ($X_B$, $Y_B$, $Z_B$), ($X_C$, $Y_C$, $Z_C$), ($X_D$, $Y_D$, $Z_D$), ($X_E$, $Y_E$, $Z_E$), and ($X_F$, $Y_F$, $Z_F$) (Here, note that, although the same reference symbol is commonly used in the first and second embodiments for convenience, the position denoted by the reference symbol in this embodiment is not the same as that denoted by the same reference symbol in the first embodiment.) Combining them with the position O' ($X_O$, $Y_O$, $Z_O$), vectors [O'A], [O'B], [O'C], [O'D], [O'E] and [O'F] from the point O' to respective points A, B, C, D, E and F are as follows.

$$[O'A]=(X_A-X_O, Y_A-Y_O, Z_A-Z_O) \quad (40)$$

$$[O'B]=(X_B-X_O, Y_B-Y_O, Z_B-Z_O) \quad (41)$$

$$[O'C]=(X_C-X_O, Y_C-Y_O, Z_C-Z_O) \quad (42)$$

$$[O'D]=(X_D-X_O, Y_D-Y_O, Z_D-Z_O) \quad (43)$$

$$[O'E]=(X_E-X_O, Y_E-Y_O, Z_E-Z_O) \quad (44)$$

$$[O'F]=(X_F-X_O, Y_F-Y_O, Z_F-Z_O) \quad (45)$$

Figure 7:
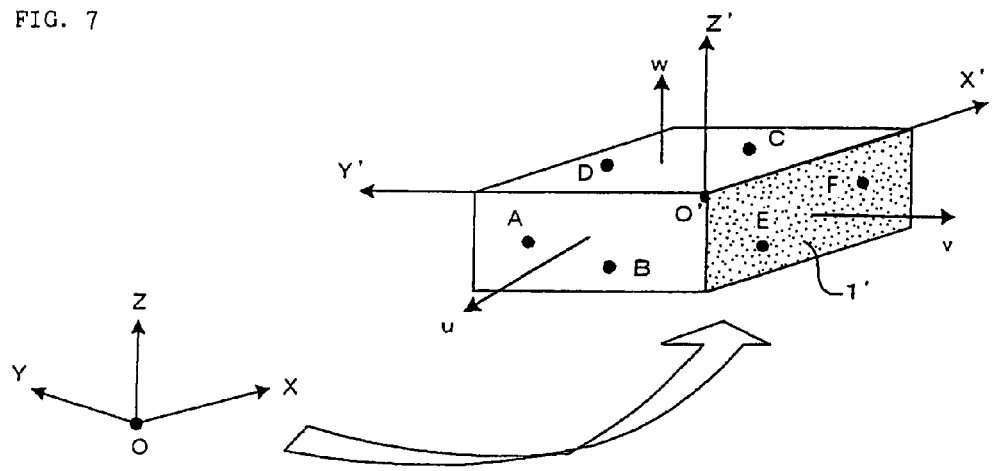
FIG. 7 is a diagram for explaining a process of transforming a coordinate system (X, Y, Z) into a coordinate system (X', Y', Z') and obtaining a location error in the second embodiment of the present invention.

Vectors u, v and w are generated by the following formulas (46) to (48) (refer to FIG. 7).

$$U=[O'A]\times[O'B] \quad (46)$$

$$V=[O'E]\times[O'F] \quad (47)$$

$$W=[O'C]\times[O'D] \quad (48)$$

where the vector u is a vector parallel to the X' direction, the vector v is a vector parallel to the Y' direction, the vector w is a vector parallel to the Z' direction, and an operator "×" denotes outer product. Thus, specific description is as follows.

$$U=((Y_A-Y_O)(Z_B-Z_O)-(Z_A-Z_O)(Y_B-Y_O), (Z_A-Z_O)(X_B-X_O)-(X_A-X_O)(Z_B-Z_O),(X_A-X_O)(Y_A-Y_O)-(Y_A-Y_O)(X_B-X_O)) \quad (49)$$

$$V=((Y_E-Y_O)(Z_F-Z_O)(Z_B-Z_O)(Y_F-Y_O), (Z_E-Z_O)(X_F-X_O)-(X_E-X_O)(Z_F-Z_O),(X_E-X_O)(Y_F-Y_O)-(Y_B-Y_O)(X_F-X_O)) \quad (50)$$

$$W=((Y_C-Y_O)(Z_D-Z_O)-(Z_C-Z_O)(Y_D-Y_O),(Z_C-Z_O)(X_D-X_O)-(X_C-X_O)(Z_D-Z_O),(X_C-X_O)(Y_D-Y_O)-(Y_C-Y_O)(X_D-X_O)) \quad (51)$$

Since the vectors u, v and w are orthogonal to one another, the following relational expressions hold.

$$u\cdot v=0 \quad (52)$$

$$v\cdot w=0 \quad (53)$$

$$w\cdot u=0 \quad (54)$$

where an operator "·" denotes inner product.
Thus, more specific description is as follows.
From formula (52), $$\{(Y_A-Y_O)(Z_B-Z_O)-(Z_A-Z_O)(Y_B-Y_O)\}*\{(Y_E-Y_O)(Z_F-Z_O)-(Z_E-Z_O)(Y_F-Y_O)\}+\{(Z_A-Z_O)(X_B-X_O)-(X_A-X_O)(Z_B-Z_O)\}*((Z_E-Z_O)(X_F-X_O)-(X_E-X_O)(Z_F-Z_O)\}+\{(X_A-X_O)(Y_B-Y_O)-(Y_A-Y_O)(X_B-X_O)\}*\{(X_E-X_O)(Y_F-Y_O)-(Y_E-Y_O)(X_F-X_O)\}=0 \quad (55)$$

From formula (53), $$\{(Y_E-Y_O)(Z_F-Z_O)-(Z_E-Z_O)(Y_F-Y_O)\}*\{(Y_C-Y_O)(Z_D-Z_O)-(Z_C-Z_O)(Y_D-Y_O)\}+\{(Z_E-Z_O)(X_F-X_O)-(X_E-X_O)(Z_F-Z_O)\}*\{(Z_C-Z_O)(X_D-X_O)-(X_C-X_O)(Z_D-Z_O)\}+\{(X_E-X_O)(Y_F-Y_O)-(Y_E-Y_O)(X_F-X_O)\}\{(X_C-X_O)(Y_D-Y_O)(Y_C-Y_O)(X_D-X_O)\}=0 \quad (56)$$

From formula (54), $$\{(Y_C-Y_O)(Z_D-Z_O)-(Z_C-Z_O)(Y_D-Y_O)\}*\{(Y_A-Y_O)(Z_B-Z_O)-(Z_A-Z_O)(Y_B-Y_O)\}+\{(Z_C-Z_O)(X_D-X_O)(X_C-X_O)(Z_D-Z_O)\}\{(Z_A-Z_O)(X_B-X_O)(X_A-X_O)(Z_B-Z_O)\}+\{(X_C-X_O)(Y_D-Y_O)-(Y_C-Y_O)(X_D-X_O)\}\{(X_A-X_O)(Y_B-Y_O)-(Y_A-Y_O)(X_B-X_O)\}=0 \quad (57)$$

Since these formulas (55), (56) and (57) are independent from one another, they can be considered as simultaneous equations, and hence, it is possible to obtain the position O' ($X_O$, $Y_O$, $Z_O$) by solving them about $X_O$, $Y_O$, and $Z_O$. If the position of the point O' is obtained, it can be regarded that three measurement points, positions (O', A, B), (O', C, D) and (O', E, F), are given respectively in each face. For this reason, the calculation similar to that in the first embodiment also applies to this embodiment, so that it is possible to obtain a transformation formula from the coordinate system (X, Y, Z) to the coordinate system (X', Y', Z').

More specifically, instead of expressing the plane which lies on three points (A, B, C) using formula (7) in the first embodiment, a plane which lies on three points (O', A, B) is expressed using a formula similar to the formula (7). Thus, the formula similar to the formula (7) is created from the coordinate values of three points (O', A, B). In addition, instead of expressing the plane which lies on three points (D, E, F) using formula (9), a plane which lies on three points (O', C, D) is expressed using a formula similar to the formula (9). Thus, the formula similar to the formula (9) is created from the coordinate values of three points (O', C, D). In addition, instead of expressing the plane which lies on three points (G, H, I) using formula (11), a plane which lies on three points (O', E, F) is expressed in a formula similar to the formula (11). Thus, the formula similar to the formula (11) is created from the coordinate values of three points (O', E, F).

Hereafter, the calculation similar to that in the first embodiment also applies to this embodiment, and inconsequence, it is possible to obtain a transformation formula from the coordinate system (X, Y, Z) to the coordinate system (X', Y', Z'). That is, it is possible to obtain the parallel translation errors $\Delta X$, $\Delta Y$ and $\Delta Z$, and rotary direction errors $\Delta A$, $\Delta B$ and $\Delta C$.

Third Embodiment

In three faces, first, second and third faces, which are orthogonal to one another, an example of measuring three points in the first face, two points in the second face, and one point in the third face, that is, six points in total, will be explained.

Figure 8:
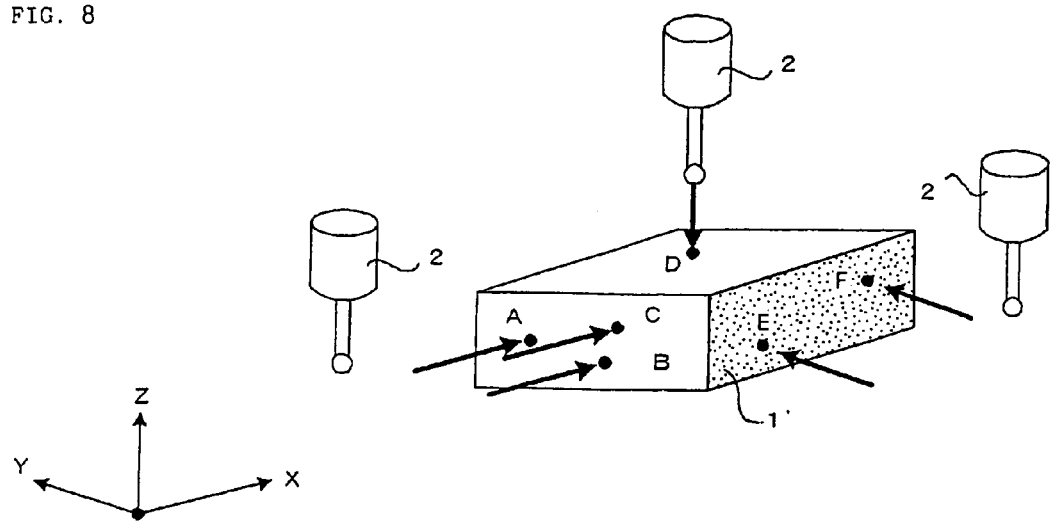
FIG. 8 is an explanatory diagram of position measurement of each face in a work in a third embodiment of the present invention.

It is assumed that the touch probe 2 is operated for each of three faces, as shown in FIG. 8, and three points, two points, and one point, points A to F, are measured in the respective three faces which are orthogonal to one another.

Let position vectors of the points A, B, C, D, E, and F in the (X, Y, Z) coordinate system be $(X_A, Y_A, Z_A)$, $(X_B, Y_B, Z_B)$, $(X_C, Y_C, Z_C)$, $(X_D, Y_D, Z_D)$, $(X_E, Y_E, Z_E)$, and $(X_F, Y_F, Z_F)$. (Here, note that, although the same reference symbol is commonly used in the first or second embodiment and this third embodiment for convenience, the position denoted by the reference symbol in this embodiment is not the same as that denoted by the same reference symbol in the first or second embodiment.)

Figure 9:
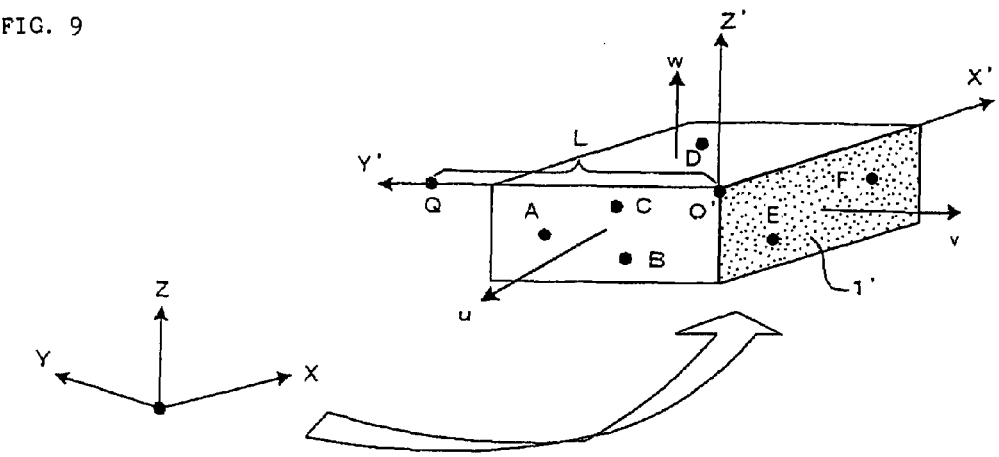
FIG. 9 is a diagram for explaining a process of transforming a coordinate system (X, Y, Z) into a coordinate system (X', Y', Z') and obtaining a location error in the third embodiment of the present invention.

Here, as shown in FIG. 9, such a point Q $(X_Q, Y_Q, Z_Q)$ that length of O'-Q becomes certain fixed length L is set on Y'-axis.

Since the point O' $(X_O, Y_O, Z_O)$ exists on the face which three points (A, B, C) generate, the following formula (58) which uses a determinant holds.

$$\begin{vmatrix} X_O & Y_O & Z_O & 1 \\ X_A & Y_A & Z_A & 1 \\ X_B & Y_B & Z_B & 1 \\ X_C & Y_C & Z_C & 1 \end{vmatrix} = 0 \tag{58}$$

This formula (58) is expanded and the following formula (59) is derived.

$$L_{ABC}X_O + m_{ABC}Y_O + n_{ABC}Z_O - P_{ABC} = 0 \tag{59}$$

where $L_{ABC}$, $m_{ABC}$, $n_{ABC}$, and $-P_{ABC}$ are coefficients and constants of $X_O$, $Y_O$, and $Z_O$ respectively when expanding formula (58).

Since the point Q $(X_Q, Y_Q, Z_Q)$ also exists on the face which three points (A, B, C) generate, the following formula (60) which uses a determinant holds.

$$\begin{vmatrix} X_Q & Y_Q & Z_Q & 1 \\ X_A & Y_A & Z_A & 1 \\ X_B & Y_B & Z_B & 1 \\ X_C & Y_C & Z_C & 1 \end{vmatrix} = 0 \tag{60}$$

This formula (60) is expanded and the following formula (61) is derived.

$$L_{ABC}X_Q + m_{ABC}Y_Q + n_{ABC}Z_Q - P_{ABC} = 0 \tag{61}$$

In addition, combining them with the position O' $(X_O, Y_O, Z_O)$, vectors [O'A], [O'B], [O'D], [O'E], [O'F] and [O'Q] from the point O' to respective points A, B, D, E, F and Q are as follows.

$$[O'A] = (X_A - X_O, Y_A - Y_O, Z_A - Z_O) \tag{62}$$

$$[O'B] = (X_B - X_O, Y_B - Y_O, Z_B - Z_O) \tag{63}$$

$$[O'D] = (X_D - X_O, Y_D - Y_O, Z_D - Z_O) \tag{64}$$

$$[O'E] = (X_E - X_O, Y_E - Y_O, Z_E - Z_O) \tag{65}$$

$$[O'F] = (X_F - X_O, Y_F - Y_O, Z_F - Z_O) \tag{66}$$

$$[O'Q] = (X_Q - X_O, Y_Q - Y_O, Z_Q - Z_O) \tag{67}$$

Vectors u, v, and w are generated by the following formulas (68) to (70). (Here, note that, although the same reference symbol is commonly used in the second embodiment and this third embodiment for convenience, the position denoted by the reference symbol in this embodiment is not the same as that denoted by the same reference symbol in the second embodiment.)

$$u = [O'A] \times [O'B] \tag{68}$$

$$v = [O'E] \times [O'F] \tag{69}$$

$$w = [O'D] \times [O'Q] \tag{70}$$

where the vector u is a vector parallel to the X' direction, the vector v is a vector parallel to the Y' direction, the vector w is a vector parallel to the Z' direction, and an operator "×" denotes outer product. Thus, specific description is as follows.

$$u = ((Y_A - Y_O)(Z_B - Z_O) - (Z_A - Z_O)(Y_B - Y_O), (Z_A - Z_O)(X_B - X_O) - (X_A - X_O)(Z_B - Z_O), (X_A - X_O)(Y_B - Y_O) - (Y_A - Y_O)(X_B - X_O)) \tag{71}$$

$$v = ((Y_E - Y_O)(Z_F - Z_O) - (Z_E - Z_O)(Y_F - Y_O), (Z_E - Z_O)(X_F - X_O) - (X_E - X_O)(Z_F - Z_O), (X_E - X_O)(Y_F - Y_O) - (Y_E - Y_O)(X_F - X_O)) \tag{72}$$

$$w = ((Y_D - Y_O)(Z_Q - Z_O) - (Z_D - Z_O)(Y_Q - Y_O), (Z_D - Z_O)(X_Q - X_O) - (X_D - X_O)(Z_Q - Z_O), (X_D - X_O)(Y_Q - Y_O) - (Y_D - Y_O)(X_Q - X_O)) \tag{73}$$

Since the vectors u, v, and w are orthogonal to one another, the following relational expressions hold.

$$u \cdot v = 0 \tag{74}$$

$$v \cdot w = 0 \tag{75}$$

$$w \cdot u = 0 \tag{76}$$

where an operator "·" denotes inner product.

Thus, specific description is as follows.

From formula (74), $$\{(Y_A - Y_O)(Z_B - Z_O) - (Z_A - Z_O)(Y_B - Y_O)\} * \{(Y_E - Y_O)(Z_F - Z_O) - (Z_E - Z_O)(Y_F - Y_O)\} + \{(Z_A - Z_O)(X_B - X_O) - (X_A - X_O)(Z_B - Z_O)\} * \{(Z_E - Z_O)(X_F - X_O) - (X_E - X_O)(Z_F - Z_O)\} + \{(X_A - X_O)(Y_B - Y_O) - (Y_A - Y_O)(X_B - X_O)\} * \{(X_E - X_O)(Y_F - Y_O) - (Y_E - Y_O)(X_F - X_O)\} = 0 \tag{77}$$

From formula (75)

$$\{(Y_E - Y_O)(Z_F - Z_O) - (Z_E - Z_O)(Y_F - Y_O)\} * \{(Y_D - Y_O)(Z_Q - Z_O) - (Z_D - Z_O)(Y_Q - Y_O)\} + \{(Z_E - Z_O)(X_F - X_O) - (X_E - X_O)(Z_F - Z_O)\} * \{(Z_D - Z_O)(X_Q - X_O) - (X_D - X_O)(Z_Q - Z_O)\} + \{(X_E - X_O)(Y_F - Y_O) - (Y_E - Y_O)(X_F - X_O)\} * \{(X_D - X_O)(Y_Q - Y_O) - (Y_D - Y_O)(X_Q - X_O)\} = 0 \tag{78}$$

From formula (76)

$$\{(Y_D-Y_O)(Z_Q-Z_O)-(Z_D-Z_O)(Y_Q-Y_O)\}*\{(Y_A-Y_O)(Z_D-Z_O)-(Z_A-Z_O)(Y_B-Y_O)\}+\{(Z_D-Z_O)(X_Q-X_O)-(X_D-X_O)(Z_Q-Z_O)\}*\{(Z_A-Z_O)(X_B-X_O)-(X_A-X_O)(Z_B-Z_O)\}+\{(X_D-X_O)(Y_Q-Y_O)-(Y_D-Y_O)(X_Q-X_O)\}*\{(X_A-X_O)(Y_B-Y_O)(Y_A-Y_O)(X_B-X_O)\}=0 \quad (79)$$

In addition, since the length of a vector (O', Q) is given as L, $$L^2=(X_Q-X_O)^2+(Y_Q-Y_O)+(Z_Q-Z_O)^2 \quad (80)$$

Since these formulas (59), (61), (77), (78), (79) and (80) are independent from one another, they can be considered as simultaneous equations, and hence, it is possible to obtain the position of the point O' ($X_O$, $Y_O$, $Z_O$) and the position of the point Q ($X_Q$, $Y_Q$, $Z_Q$) by solving them about $X_O$, $Y_O$ and $Z_O$, and $X_Q$, $Y_Q$ and $Z_Q$.

If the positions of the points O' and Q are obtained, it can be regarded that three measurement points, positions (O', A, B), (O', D, Q) and (O', E, F), are given respectively in each face. For this reason, the calculation similar to that in the first embodiment also applies to this embodiment, so that it is possible to obtain a transformation formula from the coordinate system (X, Y, Z) to the coordinate system (X', Y', Z').

More specifically, instead of expressing the plane which lies on three points (A, B, C) using formula (7) in the first embodiment, a plane which lies on three points (O', A, B) is expressed by a formula similar to the formula (7). Thus, the formula similar to the formula (7) is created from the coordinate values of three points (O', A, B). In addition, instead of expressing the plane which lies on three points (D, E, F) using formula (9), a plane which lies on three points (O', D, Q) is expressed by a formula similar to the formula (9).

Thus, the formula similar to the formula (9) is created from the coordinate values of three points (O', D, Q). In addition, instead of expressing the plane which lies on three points (G, H, I) using formula (12), a plane which lies on three points (O', E, F) is expressed using a formula similar to the formula (12). Thus, the formula similar to the formula (12) is created from the coordinate values of three points (O', E, F).

Hereafter, the calculation similar to that in the first embodiment also applies to this embodiment, and in consequence, it is possible to obtain a transformation formula from the coordinate system (X, Y, Z) to the coordinate system (X', Y', Z'). That is, it is possible to obtain the parallel translation errors ΔX, ΔY and ΔZ, and rotary direction errors ΔA, ΔB and ΔC.

Figure 10:
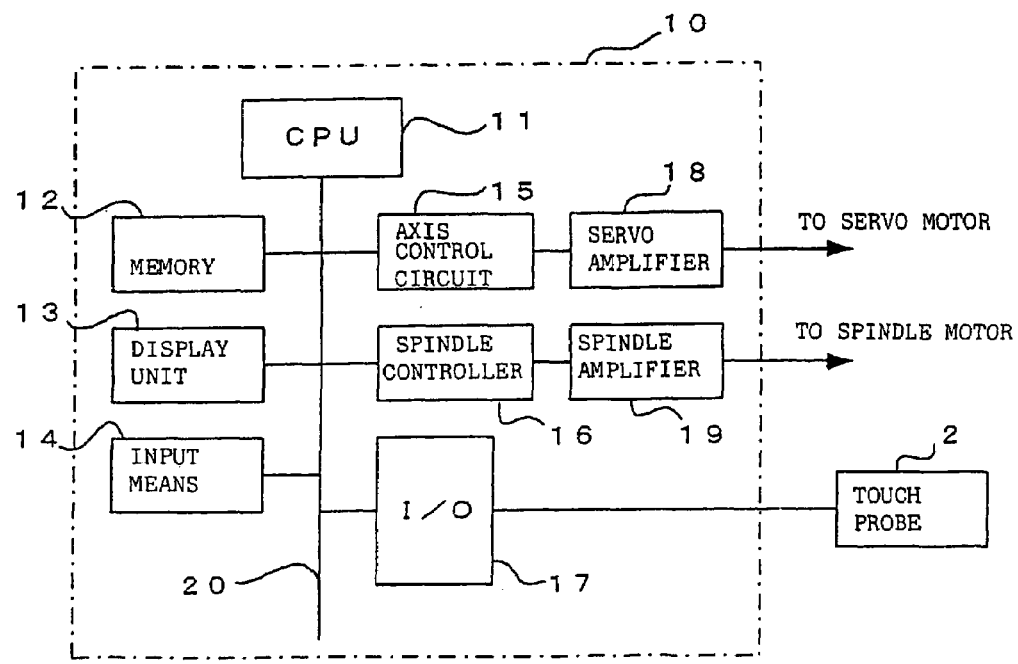
FIG. 10 is a schematic diagram of a work installation error measuring apparatus which implements the first to third embodiments of the present invention.

FIG. 10 is a block diagram of an essential part of a work installation error measuring apparatus in each of those embodiments which performs installation error measurement based on the installation error measurement principle mentioned above. It is assumed in each of these embodiments that a numerical controller which controls a machine tool serves also as this work installation error measuring apparatus. It is also possible to constitute a work installation error measuring apparatus by installing a touch probe in a personal computer, instead of a numerical controller.

In FIG. 10, connected to processor 11 through a bus 20 are memory 12 which is composed of ROM, RAM, nonvolatile memory or the like, a display unit 13 which is composed of a CRT, a liquid crystal or the like, input means 14 such as a keyboard, an axis control circuit 15 which performs drive control of a servo motor for each feed axis of a machine tool, a spindle controller 16 which performs drive control of a spindle of the machine tool, and an input/output part 17.

Furthermore, the servo motor which drives the feed axis through a servo amplifier 18 is connected to the axis control circuit 15 (note that FIG. 10 illustrates only one axis system composed of an axis controller, a servo amplifier and a servo motor). In addition, a spindle amplifier 19 is connected to the spindle controller 16, and is configured to perform drive control of the spindle motor through the spindle amplifier 19.

Moreover, the touch probe 2 is connected to the input/output part 17, and the numerical controller is also constructed as the work installation error measuring apparatus of the present invention. In this case, the hardware construction of the work installation error measuring apparatus is the same as a conventional numerical controller, except the case where the touch-probe 2 is connected to the input/output part 17, a signal is inputted when the touch probe 2 touches a work, a position of each axis at that time is detected, and a CPU is able to read a position written in RAM of the memory 12. Other difference between the work installation error measuring apparatus of the present invention and conventional numerical controller is that the software which obtains the work installation error (to be mentioned later) is stored in the memory 12.

Figure 11:
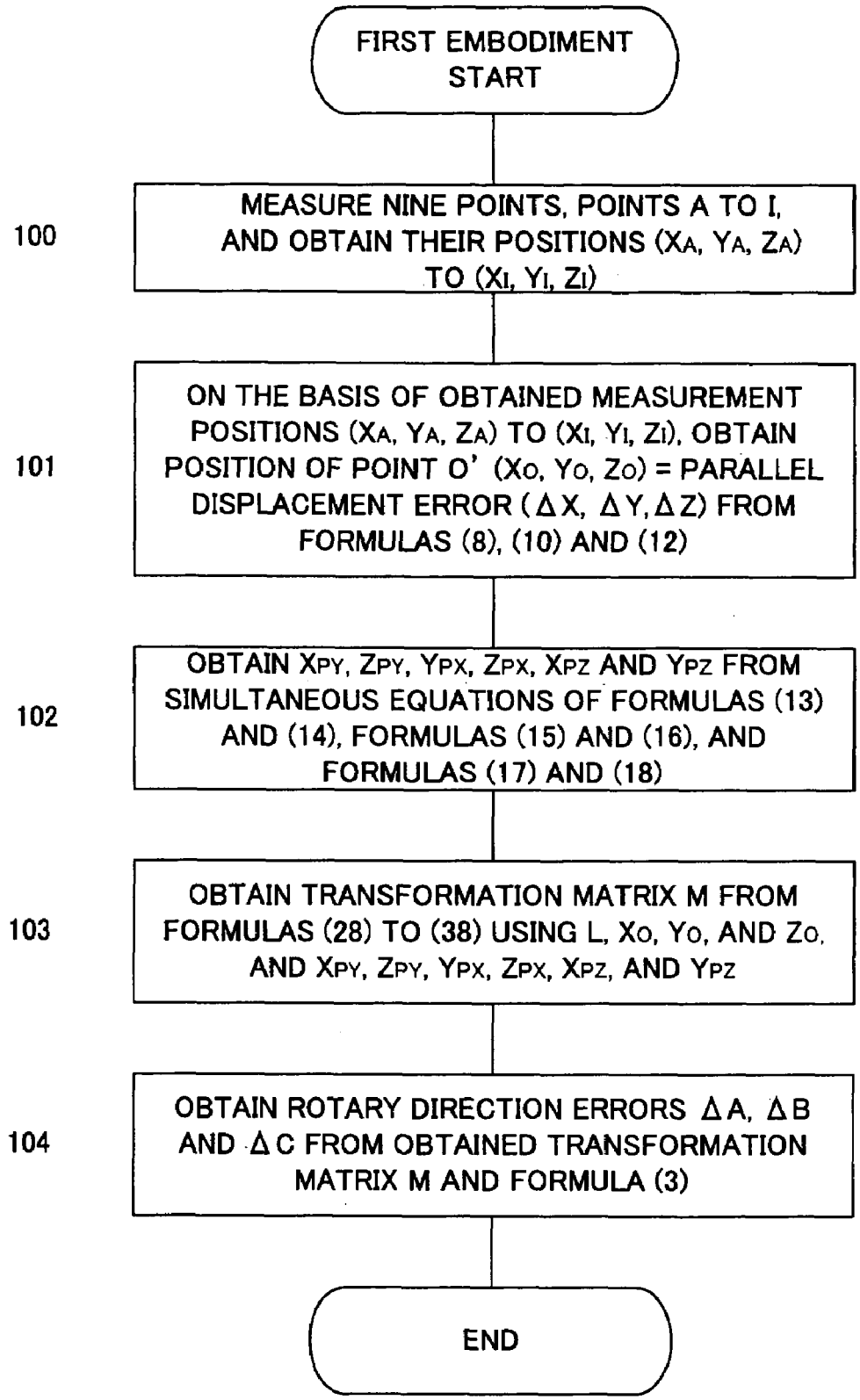
FIG. 11 is a flowchart of an operation algorithm of the first embodiment.

FIG. 11 is a flowchart showing an algorithm of work installation error measurement processing executed by the processor 11 of this work installation error measuring apparatus 10 of the first embodiment executes.

First, the processor 11 causes the touch probe 2 to touch each of three faces of a work 1' installed on a table of a machine tool, which are orthogonal to one another, at three points, respectively, and obtains measurement positions of nine points A to I ($X_A$, $Y_A$, $Z_A$) to ($X_I$, $Y_I$, $Z_I$) (step 100).

On the basis of nine measurement positions ($X_A$, $Y_A$, $Z_A$) to ($X_I$, $Y_I$, $Z_I$) obtained, by solving three formulas, formulas (8), (10) and (12), which are obtained by expanding the determinants (7), (9) and (11) of planes which lie on three points, respectively, as simultaneous equations, a position of the point (point at which three planes intersect) O' ($X_O$, $Y_O$, $Z_O$) corresponding to the origin O of the (X, Y, Z) coordinate system which is the standard coordinates is obtained (step 101). This position ($X_O$, $Y_O$, $Z_O$) represents parallel translation errors (ΔX, ΔY, ΔZ).

$X_{PY}$ and $Z_{PY}$ are obtained by substituting [$Y_O$+L], which is obtained by adding suitable length L to $Y_O$, for variable Y in formula (8) in which a formula of a plane which lies on three points (A, B, C) is expanded, and for variable Y in formula (10) in which a formula of a plane which lies on three points (D, E, F) is expanded, and solving two simultaneous equations. $Y_{PX}$ and $Z_{PX}$ are obtained by substituting [$X_O$+L], which is obtained by adding suitable length L to $X_O$, for variable X in formula (10) in which a formula of a plane which lies on three points (D, E, F) is expanded, and for variable X in formula (12) in which a formula of a plane which lies on three points (G, H, I) is expanded, and solving two simultaneous equations. $X_{PZ}$ and $Y_{PZ}$ are obtained by substituting [$Z_O$+L], which is obtained by adding suitable length L to $Z_O$, for variable Z in formula (12) in which a formula of a plane which lies on three points (G, H, I) is expanded, and for variable Z in formula (8) in which a formula of a plane which lies on three points (A, B, C) is expanded, and solving two simultaneous equations (step 102).

A transfer matrix M is obtained using formulas (28) to (36), using $X_O$, $Y_O$ and $Z_O$ which are obtained at step 101, $X_{PY}$, $Z_{PY}$, $Y_{PX}$, $Z_{PX}$, $X_{PZ}$ and $Y_{PZ}$ which are obtained at step 102, and L (step 103).

Rotary direction errors $\Delta A$, $\Delta B$, and $\Delta C$ are obtained by substituting the obtained transfer matrix M into formula (3) (step 104).

By the above processing, a location error ($X_O = \Delta X$ and $Y_O = \Delta Y$, $Z_O = \Delta Z$, $\Delta A$, $\Delta B$, and $\Delta C$) is obtained.

In addition, when obtaining a parallel translation error ($\Delta X$ and $\Delta Y$, $\Delta Z$) by performing probe radius correction including a probe installation error of the touch probe 2, a probe correction vector $P_{rc}$ shown by formula (37) is obtained from the set probe radius r and the probe installation error ($\Delta P_X$, $\Delta P_Y$, $\Delta P_Z$), calculation of formula (38) is carried out from the probe correction vector $P_{rc}$ and transfer matrix M to obtain probe radius correction $P_{rc}'$ in the (X, Y, Z) coordinate system, and calculation of formula (39) is carried out to obtain parallel translation error ($\Delta X'$, $\Delta Y'$, $\Delta Z'$) which is subjected to probe radius correction including the probe installation error.

Figure 12:
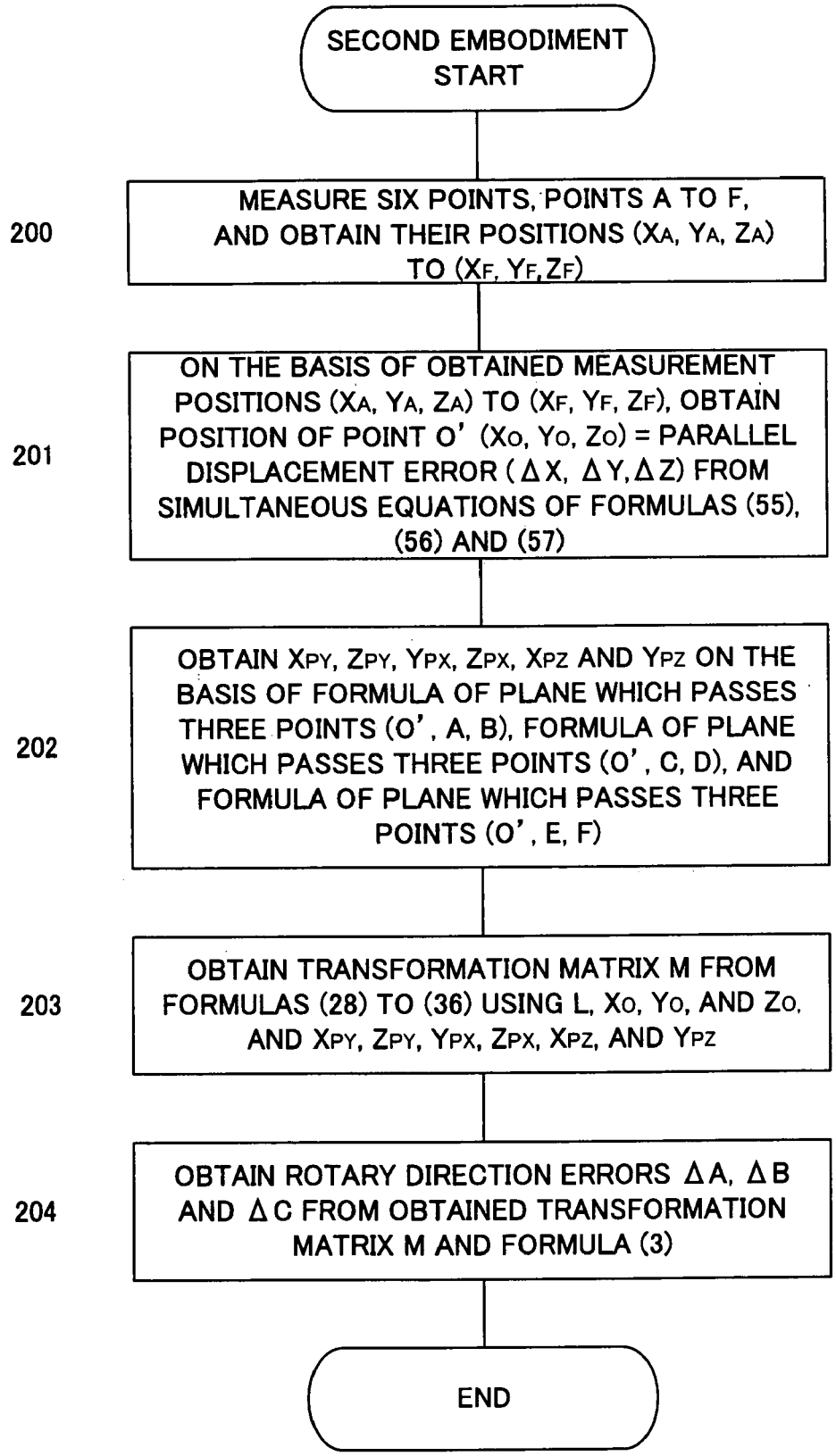
FIG. 12 is a flowchart of an operation algorithm of the second embodiment.

FIG. 12 is a flowchart showing an algorithm of work installation error measurement processing executed by the processor 11 of this work installation error measuring apparatus 10 of the second embodiment mentioned above.

First, the processor 11 causes the touch probe 2 to touch each of three faces of a work 1' installed on a table of a machine tool, which are orthogonal to one another, at two points, respectively, and obtains measurement positions of nine points A to F ($X_A$, $Y_A$, $Z_A$) to ($X_F$, $Y_F$, $Z_F$) (step 200).

Substituting the obtained ($X_A$, $Y_A$, $Z_A$) to ($X_F$, $Y_F$, $Z_F$) into formulas (55), (56), and (57) to solve simultaneous equations of three formulas, a position ($X_O$, $Y_O$, $Z_O$) = ($\Delta X$, $\Delta Y$, $\Delta Z$) of a point (point at which three planes intersect with one another) O' corresponding to the origin O of the (X, Y, Z) coordinate system which is a reference coordinate system (step 201).

On the basis of expansion formula of the determinant of the plane which lies on three points (O', A, B), expansion formula of the determinant of the plane which lies on three points (O', C, D), and expansion formula of the determinant of the plane which lies on three points (O', E, F), formulas corresponding to the formulas (13) to (18) in the first embodiment are obtained, and simultaneous equations of two formulas are solved so that $X_{PY}$, $Z_{PY}$, $Y_{PX}$, $Z_{PX}$, $X_{PZ}$, and $Y_{PZ}$ are obtained (step 202).

Hereafter, processing of steps 203 and 204 which are the same as steps 103 and 104 in the first embodiment is executed to obtain the location error ($X_O = \Delta X$, $Y_O = \Delta Y$, $Z_O = \Delta Z$, $\Delta A$, $\Delta B$, and $\Delta C$). In addition, also in this second embodiment, when obtaining a parallel translation error by performing probe radius correction including a probe installation error, the same procedure as in the first embodiment is performed.

Figure 13:
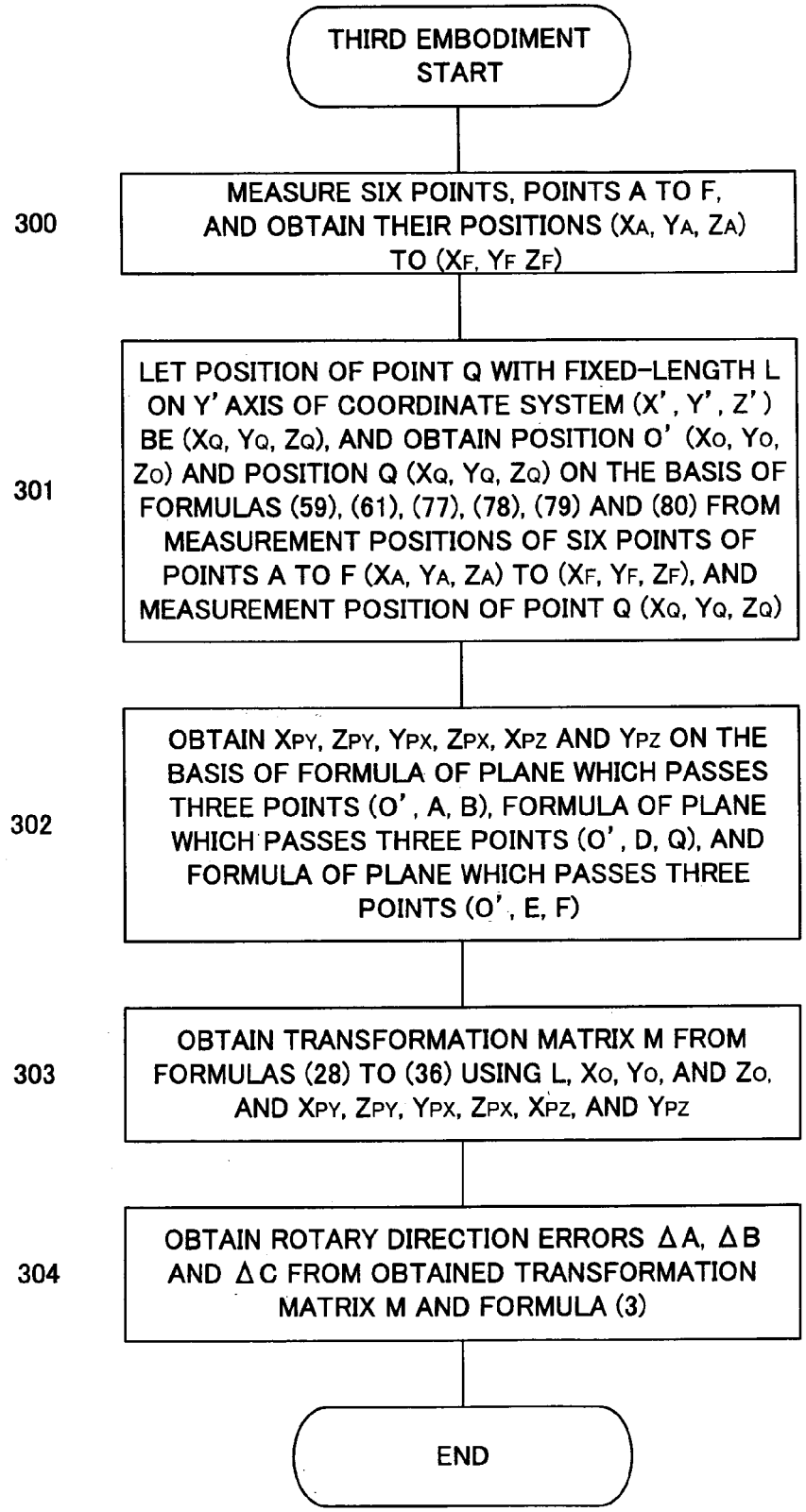
FIG. 13 is a flowchart of an operation algorithm of the third embodiment.

FIG. 13 is a flowchart showing an algorithm of work installation error measurement processing executed by the processor 11 of this work installation error measuring apparatus 10 of the third embodiment mentioned above.

First, the processor 11 causes the touch probe 2 to touch each of three faces, a first, second and third faces, of a work 1' installed on a table of a machine tool, which are orthogonal to one another, at three points on the first face, two points on the second face and one point on the third face, and obtains measurement positions of six points A to F ($X_A$, $Y_A$, $Z_A$) to ($X_F$, $Y_F$, $Z_F$) (step 300).

A point Q ($X_Q$, $Y_Q$, $Z_Q$) whereby length of O'Q becomes fixed length L is set on the Y'-axis. Since points O', A, B, and C lies in the same plane, a determinant (58) holds and its expansion (59) is obtained. Similarly, since the points Q, A, B and C lies in the same plane, using a determinant (60) that holds; its expansion (61) is obtained. Solving simultaneous equations of these formulas (59) and (61), and formulas (77), (78), (79) and (80), the position O' ($X_O$, $Y_O$, $Z_O$) = ($\Delta X$ and $\Delta Y$, $\Delta Z$) and the position Q ($X_Q$, $Y_Q$, $Z_Q$) are obtained (step 301).

Hereafter, a transfer matrix is obtained on the basis of formulas of planes which lie on three points by the same procedures as those in the first and second embodiments. That is, on the basis of expansion formula of the determinant of the plane which lies on three points (O', A, B), expansion formula of the determinant of the plane which lies on three points (O', D, Q), and expansion formula of the determinant of the plane which lies on three points (O', E, F), formulas corresponding to the formulas (13) to (18) in the first embodiment are obtained, and simultaneous equations of two formulas are solved so that $X_{PY}$, $Z_{PY}$, $Y_{PX}$, $Z_{PX}$, $X_{PZ}$ and $Y_{PZ}$ are obtained (step 302).

Hereafter, processing of steps 303 and 304 which are the same as steps 103 and 104 in the first embodiment is executed to obtain the location error ($X_O = \Delta X$, $Y_O = \Delta Y$, $Z_O = \Delta Z$, $\Delta A$, $\Delta B$, and $\Delta C$). In addition, also in this third embodiment, when obtaining a parallel translation error by performing probe radius correction including a probe installation error, the same procedure as in the first embodiment is performed.

What is claimed is:

1. A work installation error measuring apparatus which measures an installation error of a work which is installed on a table of a machine tool and which has at least three faces orthogonal to one another, comprising:
   means for measuring positions of at least six points in the three faces orthogonal to one another; and
   means for obtaining three formulas representing said three faces from the positions of the at least six points measured, and obtaining, from the three formulas, parallel translation errors $\Delta X$, $\Delta Y$, and $\Delta Z$ in the X, Y, and Z axial directions, and rotary direction errors $\Delta A$, $\Delta B$, and $\Delta C$ around the respective X-, Y-, and Z-axes.

2. A work installation error measuring apparatus which measures an installation error of a work which is installed on a table of a machine tool and which has at least three faces orthogonal to one another, comprising:
   means for measuring positions of three points in each of the three faces orthogonal to one another, that is, positions of nine points in total; and
   means for obtaining three formulas representing said three faces from the positions of the nine points measured, and obtaining, from the three formulas, parallel translation errors $\Delta X$, $\Delta Y$, and $\Delta Z$ in the X, Y, and Z axial directions, and rotary direction errors $\Delta A$, $\Delta B$, and $\Delta C$ around the respective X-, Y-, and Z-axes at the time of installation of a work.

3. A work installation error measuring apparatus which measures an installation error of a work which is installed on a table of a machine tool and which has at least three faces orthogonal to one another, comprising:
   means for measuring positions of two points in each of the mutually orthogonal three faces, that is, positions of six points in total; and
   means for obtaining three formulas representing said three faces from the positions of the six points measured, and obtaining, from these three formulas, parallel translation errors $\Delta X$, $\Delta Y$, and $\Delta Z$ in the X, Y, and Z axial directions, and rotary direction errors $\Delta A$, $\Delta B$, and $\Delta C$ around the respective X-, Y-, and Z-axes at the time of installation of a work.

4. A work installation error measuring apparatus which measures an installation error of a work which is installed on a table of a machine tool and which has at least three faces, first, second and third faces, orthogonal to one another, comprising:

means for measuring three points in the first face, two points in the second face, and one point in the third face, that is, positions of six points in total; and means for obtaining three formulas representing said three faces from the positions of the six points measured, and obtaining, from the three formulas, parallel translation errors $\Delta X$, $\Delta Y$, and $\Delta Z$ in the X, Y, and Z axial directions, and rotary direction errors $\Delta A$, $\Delta B$, and $\Delta C$ around the respective X-, Y-, and Z-axes at the time of installation of a work from the positions of the six points measured.

* * * * *

UNITED STATES PATENT AND TRADEMARK OFFICE
CERTIFICATE OF CORRECTION

PATENT NO. : 7,269,473 B2  
APPLICATION NO. : 11/397692  
DATED : September 11, 2007  
INVENTOR(S) : Toshiaki Otsuki et al.

It is certified that error appears in the above-identified patent and that said Letters Patent is hereby corrected as shown below:

In the Drawings:
Sheet 1 of 9 (Below Referenc G) (FIG. 1), Line 1, change "1" to --1'--.

Column 4, Line 60, change "R(x:$\Delta$A)" to --R(x; $\Delta$A)--.

Column 4, Line 62, change "R(y: $\Delta$B)" to --R(y; $\Delta$B)--.

Column 4, Line 64, change "R(z: $\Delta$B)" to --R(z; $\Delta$C)--.

Column 5, Line 19, change "cos $\Delta$A," to --cos$\Delta$A),--.

Column 5, Line 20, change "sin $\Delta$A." to --sin$\Delta$A.--.

Column 5, Line 36, after "system" change "(x'," to --(X',--.

Column 6 (Equation 12), Line 36, change "Z-$p_{GH1}$" to --Z-$p_{GHI}$--.

Column 6, Line 38, change "$M_{GHI}$," to --$m_{GHI}$,--.

Column 6, Line 38, change "$N_{GHI}$," to --$n_{GHI}$,--.

Column 6 (Equation 13), Line 50, change "$L_{ABc}X+m_{ABC}(Y_O+L)+n_{ABc}Z-P_{ABC}=0$" to --$L_{ABC}X+m_{ABC}(Y_O+L)+n_{ABC}Z-p_{ABC}=0$--.

UNITED STATES PATENT AND TRADEMARK OFFICE
CERTIFICATE OF CORRECTION

PATENT NO. : 7,269,473 B2
APPLICATION NO. : 11/397692
DATED : September 11, 2007
INVENTOR(S) : Toshiaki Otsuki et al.

It is certified that error appears in the above-identified patent and that said Letters Patent is hereby corrected as shown below:

Column 6, Line 57, after "$Z_{PY}$)" insert --.--.

Column 7, Line 6, change "$Y_{PX}$and" to --$Y_{PX}$ and--.

Signed and Sealed this

Eighteenth Day of March, 2008

JON W. DUDAS
*Director of the United States Patent and Trademark Office*